United States Patent [19]

Clary et al.

[11] Patent Number: 6,144,371
[45] Date of Patent: Nov. 7, 2000

[54] THINKSCRIBE COMBINED ELECTRONIC AND PAPER BASED SCHEDULING

[75] Inventors: Gregory James Clary, Apex, N.C.; Krishna Sundaram Nathan, New York, N.Y.

[73] Assignee: International Business Machines Corporation, Armonk, N.Y.

[21] Appl. No.: 09/040,581

[22] Filed: Mar. 18, 1998

[51] Int. Cl.[7] .................................................... G09G 5/00
[52] U.S. Cl. ........................................ 345/173; 345/146
[58] Field of Search ................................... 345/173–179, 345/145, 146; 178/18.01, 18.03, 19.01; 382/187, 188, 189; 707/512, 513, 500, 541; 705/7–9

[56] References Cited

U.S. PATENT DOCUMENTS

| | | | |
|---|---|---|---|
| 4,136,336 | 1/1979 | Abe et al. | 340/365 S |
| 4,656,317 | 4/1987 | Tsugei et al. | 178/18 |
| 4,661,656 | 4/1987 | Rodgers et al. | 178/18 |
| 4,672,154 | 6/1987 | Rodgers et al. | 178/19 |
| 4,745,491 | 5/1988 | Kishi et al. | 358/300 |
| 5,049,862 | 9/1991 | Dao et al. | 340/706 |
| 5,063,600 | 11/1991 | Norwood | 345/173 |
| 5,157,737 | 10/1992 | Sklarew | 178/18 |
| 5,177,328 | 1/1993 | Ito et al. | 178/18 |
| 5,243,149 | 9/1993 | Comerford et al. | 178/18 |
| 5,570,109 | 10/1996 | Jenson | 345/146 |
| 5,627,349 | 5/1997 | Shetye et al. | 178/18 |
| 5,652,412 | 7/1997 | Lazzouni et al. | 345/179 |

*Primary Examiner*—Regina Liang
*Attorney, Agent, or Firm*—Paul J. Otterstedt, Esq.; Heslin & Rothenberg, P.C.

[57] ABSTRACT

A scheduling facilitation system includes a recording unit, a markable surface (e.g., a template), and a stylus. The recording unit includes a memory, a logic design implementation (e.g., software and/or hardware), and a working surface. The memory stores an electronic representation of a schedule. The logic design implementation serves to correlate the working surface to the schedule. The working surface is superimposed with the markable surface. A stylus stroke signal (e.g., a first radio frequency) conveys to the recording unit scheduling information for a selected entry location of the schedule. A stylus stroke mark (e.g., ink) concurrently conveys to the markable surface the scheduling information. The memory stores the scheduling information. A check signal (e.g., a second radio frequency and/or a soft button activation) can search for scheduling opening(s) and/or conflict(s).

40 Claims, 6 Drawing Sheets

THINKSCRIBE COMBINED ELECTRONIC AND PAPER BASED SCHEDULING

CROSS-REFERENCE TO RELATED APPLICATION

This application contains subject matter which is related to the subject matter of the following application, which is assigned to the same assignee as this application. The below-listed application is hereby incorporated herein by reference in its entirety:

"METHODS, SYSTEMS AND PRODUCTS PERTAINING TO A DIGITIZER FOR USE IN PAPER BASED RECORD MAKING SYSTEMS," by Clary et al., Ser. No. 08/747,735, filed Nov. 12, 1996.

TECHNICAL FIELD

This invention relates, generally, to computer-assisted scheduling and, more particularly, to use of computers in conjunction with paper records for scheduling.

BACKGROUND ART

Computerized recording units to digitize text concurrently with hand writing thereof so that the handwritten text can be processed as data are known. Such digitization equipment can, for example, employ a digitizing tablet to generate data that represents coordinates of an electronic stylus applied thereto. In one such system described in the above-referenced, commonly assigned application, the digitizing tablet can generate positional information by detecting emissions of a first radio frequency from the stylus. The stylus can further include an electronic inking tip, such as a pressure sensor located therein for generating a second radio frequency when the stylus is in contact with a writing surface. By monitoring these first and second radio frequencies across a radio-sensitive grid, the digitizing tablet can generate a data stream representative of strokes of the stylus. That is, text written on or over the surface of the digitizing tablet can be recorded as "stroke" data. In addition, the tip of the stylus can have physical inking capabilities that allow concurrent physical marking of paper laid atop the digitizing tablet. In such recording units, recognition processes can convert "stroke" data into character strings. Plus, image data can be generated from "stroke" data in order to graphically display the strokes (e.g., on an LCD display screen).

It would be desirable to be able to employ such recording units for scheduling or recording of events, in conjunction with paper-based appointment instruments. Examples of such paper-based appointment instruments are organizers, (e.g., DAYMINDER® or DAYTIMER™) date planners, calendars, schedules, and diaries. For instance, a date planner might have pages with a template thereon for displaying lines and legends designating the days of the week. So, an individual can use the format of the pages to organize text written thereupon. Furthermore, the pages might have holes punched therethrough in order to allow placement of the pages into a binder. Available software products allow users to enter text into a PC for printing in an appointment format suitable for placement into such a binder.

The existing handwriting recording units do not facilitate integrated electronic and paper-based scheduling. However, it would be desirable to enable handwritten scheduling information to be readily correlated with computerized recording and processing in such units.

SUMMARY OF THE INVENTION

Pursuant to the present invention, shortcomings of the existing art are overcome and additional advantages provided through the provision of a scheduling facilitation capability in a computerized handwriting recording and processing unit. An electronic representation of a schedule is stored in the recording unit. The schedule includes a number of entry locations. The recording unit includes a working surface thereon. On the working surface is superimposed a markable surface having thereon a physical representation of the entry locations. The physical representation includes therein one or more designations allowing user identification of a selected entry location of the entry locations. A part of the working surface is correlated to the entry locations. The selected entry location is selected on the markable surface with a stylus. A stroke signal and a stroke mark are provided using the stylus. The stroke signal conveys to the recording unit a section of scheduling information for the selected entry location. The stroke mark conveys to the markable surface the section of scheduling information. An indication of the section of scheduling information is stored in a portion of the electronic representation of the schedule, associated with the selected entry location.

The selected entry location can be reserved in the helectronic representation of the schedule. A check signal can be provided for the recording unit upon user selection of the selected entry location. The recording unit can associate the check signal with the selected entry location. Responsive to the check signal, the recording unit can check the electronic representation of the schedule for scheduling information already associated with the selected entry location.

The check signal can comprise user selection of a soft button, and/or user holding of the stylus proximate to the working surface.

Responsive to the check signal, it can also be indicated whether the scheduling information exists in the electronic representation of the schedule. The indication can include audio signal(s) and/or visual signal(s). A portion of the scheduling information can be indicated to a user, when the scheduling information exists, such as by displaying the portion.

A portion of the scheduling information can be user deletable, such as by user operation of a soft button and/or user input of a special stroke with the stylus.

In a further aspect of the present invention, the recording unit can be linked to a network for synchronization of the schedule. The synchronization can include uploading information from the recording unit to the network, and/or downloading information from the network to the recording unit. The network can provide a number of levels of authorization for controlling user access to the schedule.

In yet another aspect of the present invention, a scheduling facilitation system includes a recording unit, a markable surface, and a stylus. The recording unit includes a memory, a logic design implementation, and a working surface. The memory stores an electronic representation of a schedule including a number of entry locations therein. The logic design implementation serves to correlate a part of the working surface to the entry locations. On the working surface is superimposed the markable surface, having thereon a physical representation of the entry locations. The physical representation includes therein one or more designations allowing user identification of a selected entry location of the entry locations. The stylus allows user selection of the selected entry location on the markable surface. The stroke signal conveys to the recording unit a section of scheduling information for the selected entry location. The stroke mark conveys to the markable surface the section of scheduling information. The memory stores an indication of the section of scheduling information in a portion of the electronic representation of the schedule, associated with the selected entry location.

The markable surface can comprise a layer of paper, and the stroke mark can comprise ink, graphite, and/or other marking means. A number of layers can be disposed between the markable surface and the working surface. The stroke signal can comprise a radio frequency. The recording unit can include a digitizer and can have a character recognition capability.

The logic design implementation can include software and/or hardware. The recording unit can indicate that the selected entry location is reserved, in the electronic representation of the schedule.

The stylus or other means can provide a check signal for the recording unit upon user selection of the selected entry location. The recording unit can associate the check signal with the selected entry location. Responsive to the check signal, the recording unit can check the electronic representation of the schedule for scheduling information already associated with the selected entry location.

The logic design implementation can serve to associate the check signal with the selected entry location. An indicator can serve to indicate whether the scheduling information exists in the electronic representation of the schedule, responsive to the check signal. The indicator can provide audio signal(s) and/or visual signal(s), when the scheduling information exists. The indicator can serve to indicate to a user a portion of the scheduling information, such as by displaying the portion of the scheduling information.

In a further aspect of the invention, a paper-based correlation system includes a recording unit, a markable surface, and a stylus. The recording unit includes a memory, a logic design implementation, and a working surface. The memory stores an electronic representation of a template including a number of entry locations therein. The logic design implementation serves to correlate a part of the working surface to the entry locations. On the working surface is superimposed a markable surface, having thereon a physical representation of the entry locations. The physical representation includes therein one or more designations allowing user identification of a selected entry location of the entry locations. The stylus allows user selection of the selected entry location on the markable surface. The stylus provides a stroke signal and a stroke mark. The stroke signal conveys to the recording unit a section of field information for the selected entry location. The stroke mark conveys to the markable surface the section of field information. The memory stores an indication of the section of field information in a portion of the electronic representation of the template, associated with the selected entry location.

The template can resemble a negotiable instrument. The logic design implementation can include software and/or hardware.

Thus, the present invention advantageously allows handwritten scheduling and other field defined information to be correlated with computerized recordings in a manner which facilitates use of paper-based instruments such as organizers, date planners, calendars, schedules, and diaries.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

BEST MODE FOR CARRYING OUT THE INVENTION

In accordance with the principles of the present invention, a scheduling facilitation system is provided in which a recording unit correlates strokes, handwritten with a stylus upon a paper-based schedule, to an electronic representation of the schedule.

An example of a scheduling facilitation system incorporating and using the novel features of the present invention is represented in the Figures and described in detail herein.

Figure 1:
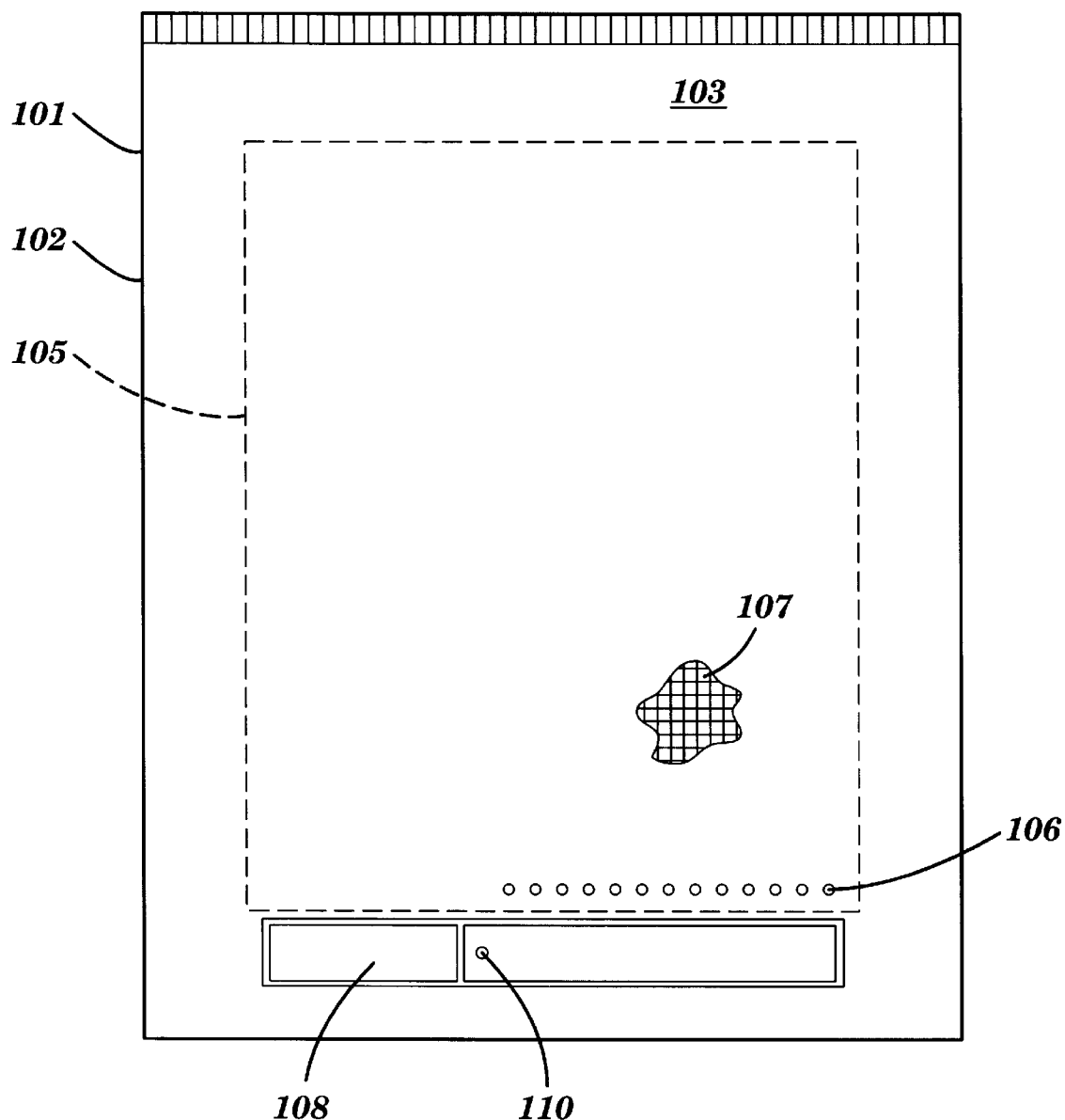
FIG. 1 is a top plan view of one example of a recording unit incorporating and using the scheduling facilitation capabilities of the present invention, the recording unit illustrated with a region therein serving as a cutaway, sectional, partial representation of a radio-sensitive grid.

In this exemplary embodiment, a scheduling facilitation system 100 (FIG. 1) includes a recording unit 101 with a working surface 103 thereon, an electronic, inking stylus or pen 152 (FIG. 4) therefor, and markable surface(s) 150 (FIG. 3) superimposed on the working surface 103. In one example, the markable surface might be laid atop the working surface. In another example, the markable surface might be a top sheet, or an intermediate sheet, of a number of sheets of paper (e.g., an appointment book) positioned in a stack extending outwardly from the working surface. Furthermore, the recording unit might have any desired orientation and/or size. Moreover, the markable surface(s) might be laid and/or held on, and/or fastened and/or attached to, the working surface.

Recording unit 101 includes housing 102, digitizing tablet or digitizer 105, a number of (e.g., "soft") buttons 106, display (e.g., an LCD) 108, a number of indicators 110 and/or 112 (FIG. 3), a microcontroller 120 (FIG. 2), a number of data storage devices 122 and 124 (FIG. 2), logic design implementation(s) 136, a real-time clock 121, software select 126, infrared transceiver 128, RS-232 serial port 130, and electrical source 134. Furthermore, the microcontroller is coupled to digitizer subsystem 132. Optionally, PCMCIA slot 992 may be coupled to processor 120, and used to attach peripheral devices such as a modem and/or additional memory. For example, the PCMCIA slot may allow connection to a network, as discussed herein.

Figure 2:
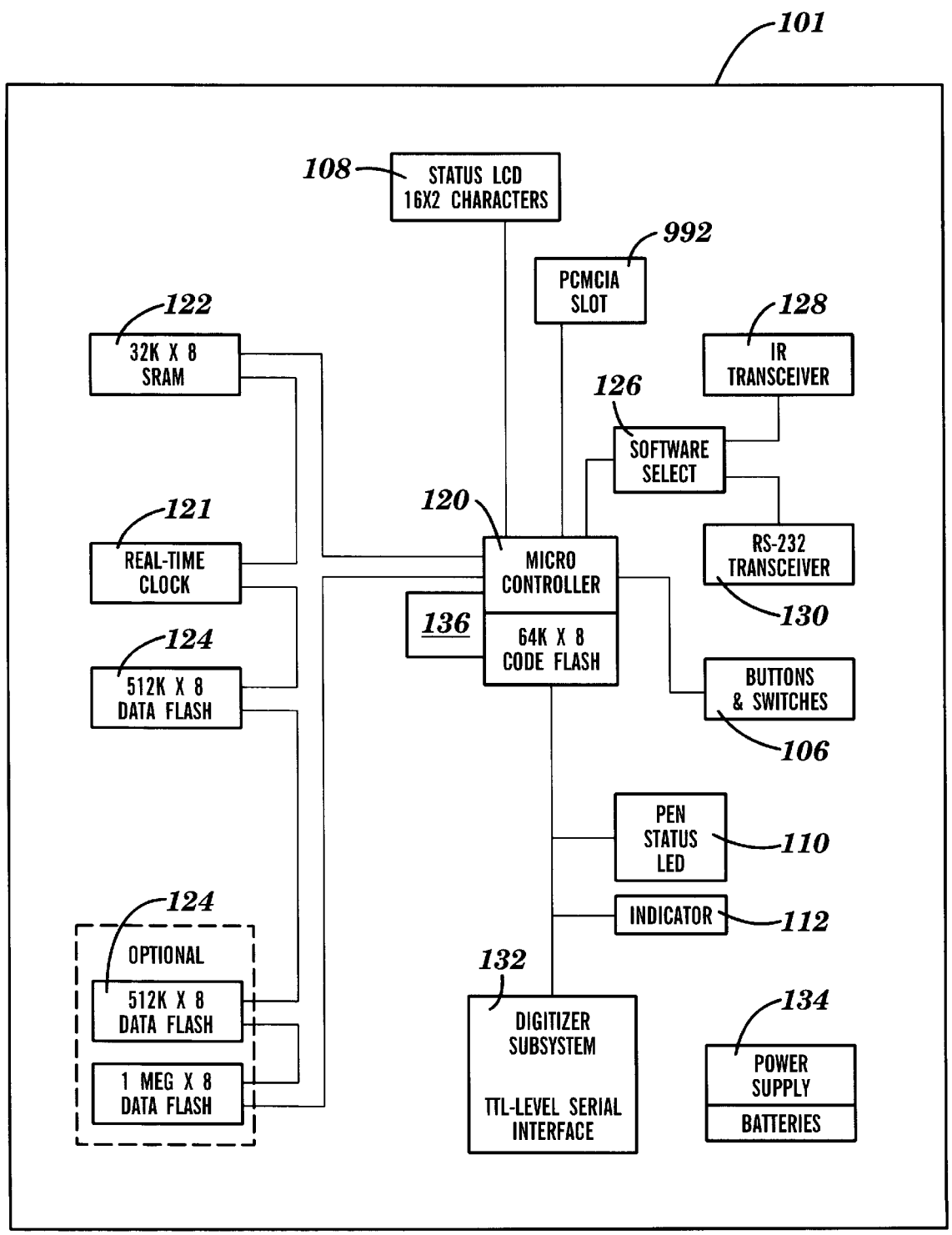
FIG. 2 illustrates a block diagram of one example of components of the recording unit of FIG. 1, in accordance with the principles of the present invention.

FIG. 2 illustrates a block diagram of one example of the interconnection of electronic components of recording unit 101. In particular, microcontroller 120 is coupled to a real-time clock 121, volatile and nonvolatile memory devices 122 and 124, display 108, indicators 110 and 112, and an I/O interface acting through software select 126 and including infrared transceiver 128 and RS-232 serial port 130. Furthermore, the microcontroller is coupled to digitizer subsystem 132 including a digitizing chip set and an electromagnetic sensor. The microcontroller uses software stored in the memory device(s) for managing operation of the components, such that a data stream is generated by digitizer 105, in response to strokes produced by the inking stylus 152, for processing and/or recordation. A description of the operation of these components for such purpose is presented hereinafter, with further details provided in the above-incorporated application Ser. No. 08/747,735.

Figure 3:
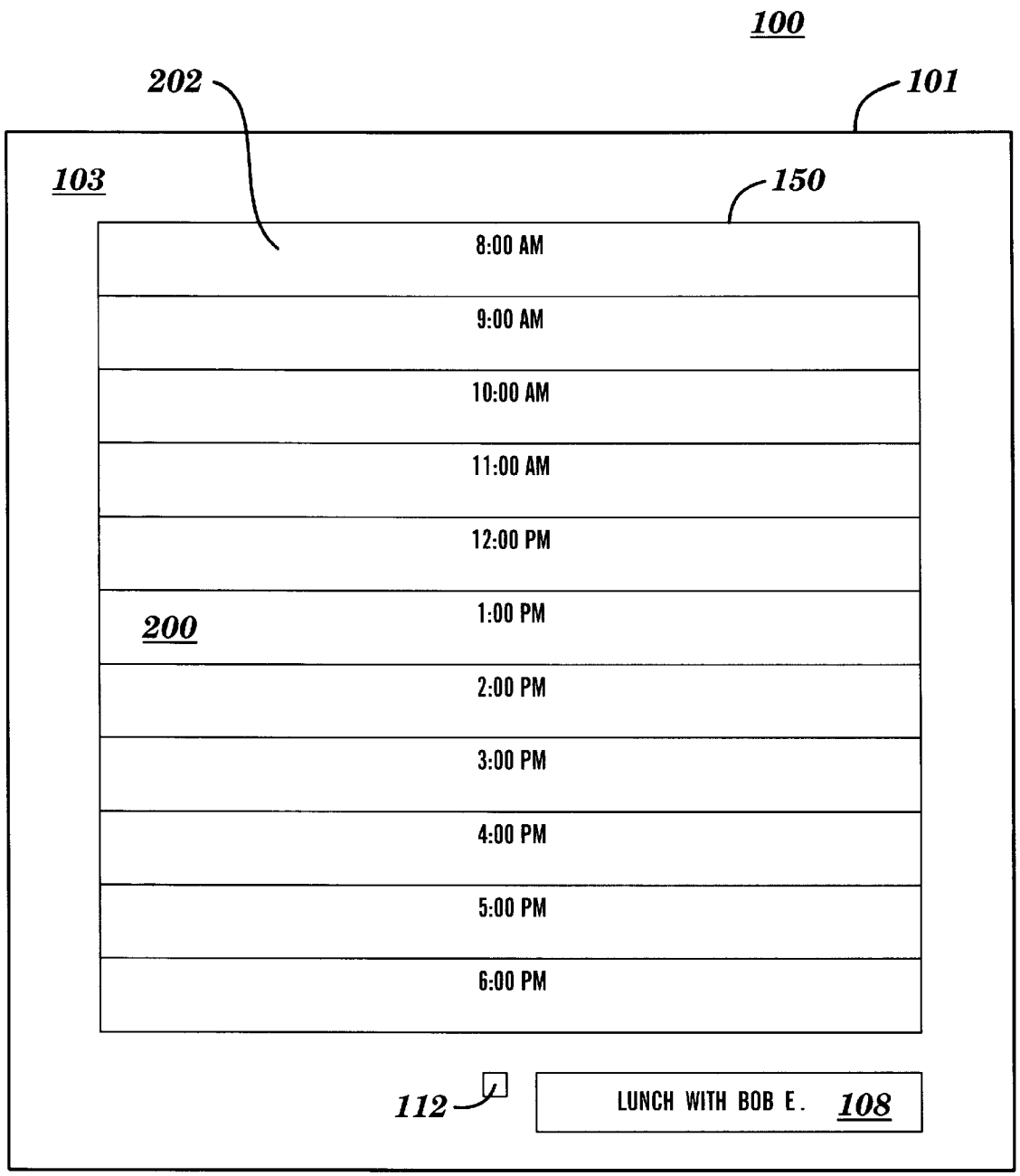
FIG. 3 is a top plan view of another example of the recording unit of FIG. 1 including a markable surface positioned thereon for scheduling purposes, and illustrating a conflict check capability of the present invention.

Although the number, type, layout and interconnection of the components of recording unit 101 might vary from that illustrated in FIG. 2, one preferred example of an indicator 110 is a "pen-down" LED 110, which illuminates during periods of contact or engagement between stylus 152 and a markable surface 150 (FIG. 3). The markable surface might include a sheet or a pad of paper which is superimposed or engagingly positioned on working surface 103 of the recording unit.

Returning to FIG. 1, digitizer 105 preferably includes an active area capable of receiving a number of electromagnetic signals (e.g., a number of radio frequencies), for instance, from pen or stylus 152. The digitizer might monitor signal(s) using receiver 107. For purposes of illustration, the receiver 107 is depicted as a radio-sensitive grid. Preferably, recording unit 101 can distinguish among "pen-down," "pen-up in-proximity," and "pen-up out-of-proximity" locations, conditions, and/or states of the stylus, as discussed further below. The digitizer can be formed such that a portion of the active area is sized to accommodate any size markable surface 150, for example, 8.5 in. by 11 in. paper, A4 paper, and/or any standard or non-standard size and/or shape of paper, including any number, configuration, and/or variety of sheets.

In accordance with the principles of the present invention, recording unit 101 further includes logic design implementation(s) 136 (FIG. 2) coupled to microcontroller 120 to facilitate scheduling. As represented in FIGS. 3–6 and discussed further below, the logic design implementations of recording unit 101 serve to correlate entry location(s) 200 of a template 202 of markable surface 150 to entry locations in an electronic representation of the template, possibly as part of a much larger database. For instance, the electronic representation might exist for a length of time in memory of the recording unit. As illustrated, the entry locations might be time slots 200 for a schedule 202. For example, a user 154 (or a manufacturer, retailer, and/or servicing entity) might load a disk into, or otherwise configure, the recording unit for associating region(s) of working surface 103 with particular entry location(s) 200 of the template. Exemplary forms of the template include organizers, (e.g., DAYMINDER® or DAYTIMER™) date planners, calendars, schedules, and/or diaries.

For instance, a logic design implementation might serve to correlate working surface 103 to a selected template 202, including therein entry locations 200 representative of hours of the day. Then, user 154 might position a sheet 202 upon the working surface with the intention of recording and/or accessing scheduling information for one or more selected days or weeks of, for instance, a month, a year, a decade, or any selected interval or duration. In accordance with the present invention, recording unit 101 (and/or a network linkable thereto) might store a full record (or a significant amount) of the user's schedule in memory, and allow the user to access the same (through an interface in the form of the working surface, the template, and the stylus) in any selected form such as one day or week at a time.

Figure 5:
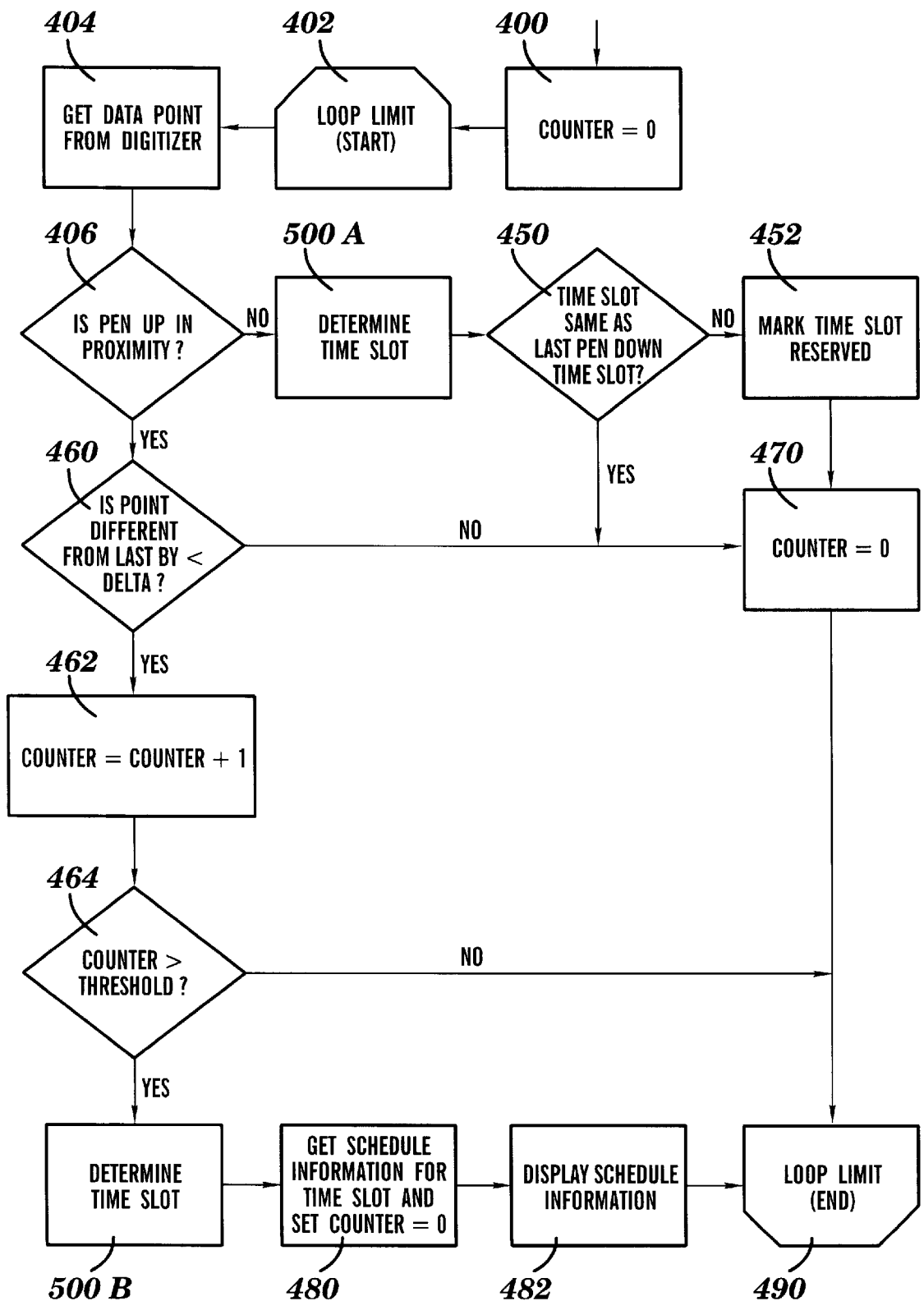
FIG. 5 depicts one embodiment of the logic used by the recording unit of FIG. 1 to accomplish facilitation of scheduling, in accordance with the principles of the present invention.
Figure 6:
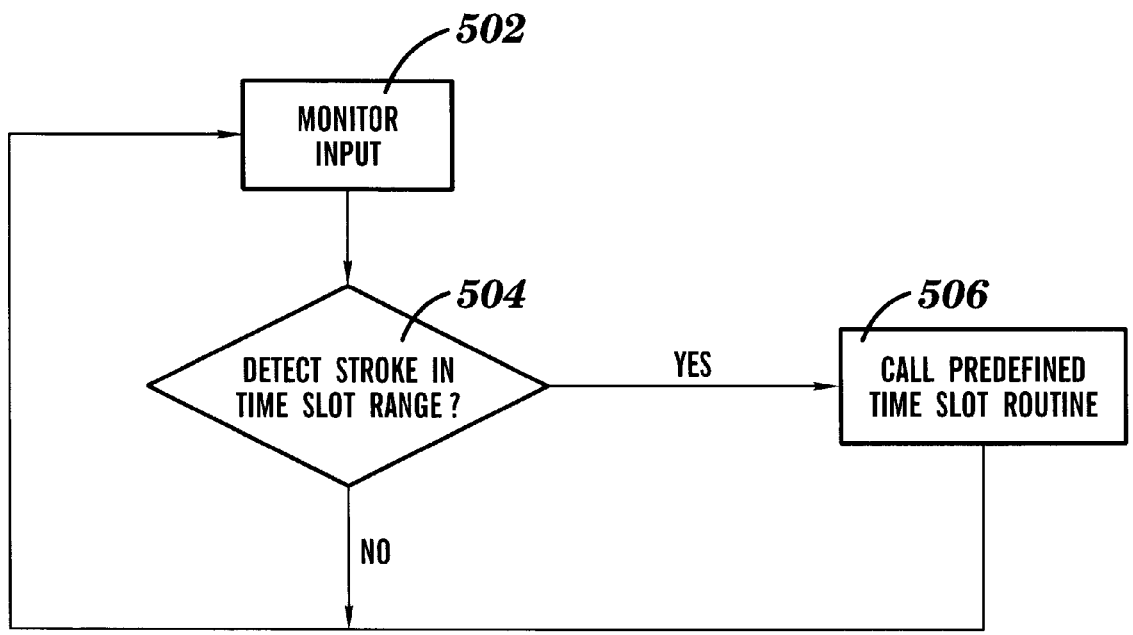
FIG. 6 depicts one embodiment of the logic used by the recording unit of FIG. 1 to accomplish determination of a time slot, in accordance with the principles of the present invention.

As discussed further below, FIGS. 5–6 depict exemplary logic for the logic design implementations. As will be appreciated by those skilled in the art, the design implementations might include software (e.g., code instructions and/or statements) and/or hardware (e.g., gates and/or devices). For instance, the logic might include finite-state machines, Boolean algebra, and/or "fuzzy" logic. Also, the logic design might include digital logic, machine language(s), assembly language(s), and/or high-level languages (e.g., C, FORTRAN, and/or LISP), including those suited for object orientation (e.g., C++ and/or "JAVA").

In addition, display 108 can provide prompts for, and/or communicate information to, a user 154, such as already recorded scheduling information for a selected entry location.

Further explanation of the construction and operation of components of the scheduling facilitation system will now be presented. With regard to working surface 103, a button 106 might be a "soft button" formed as an area of working surface 103 which superimposes digitizer 105. For example, a button 106 might be an area which is predefined to transmit to recording unit 101 a specific input when a stimulus is detected at the button. That is, a soft button might correspond to an area of the digitizer which is predefined to indicate a specific input value when stroke information is detected, for example, over that area. This general type of soft button is disclosed in the above-incorporated application Ser. No. 08/747,735. Furthermore, button(s) 106 might have any location(s) or position(s) on, or in, the recording unit. For instance, the configuration of button(s) might be designated by default or through a customization procedure. Optionally, a legend might accompany a given button 106 for an indication of a function thereof.

Preferably, electronic, inking stylus 152 includes electronic (e.g., integrated) circuitry, a battery and an ink cartridge, and emits, or resonates at, a first radio frequency. Optionally, the stylus could employ graphite or other marking means. For purposes of this discussion, this first radio frequency might serve as a "tracking" signal or a "pen-up in-proximity" signal. In one embodiment, digitizer 105 emits a field (at a particular frequency) toward the core of the stylus. The stylus can be formed to resonate in that field (at that frequency). Thus, the stylus might supply the tracking signal to the recording unit simply by being close enough to recording unit 101, without powering any of its own electronics.

Furthermore, stylus 152 preferably includes a switch or a pressure sensor (not shown) for generating a second radio frequency (e.g., a different signal and/or an additional signal) when the tip of the stylus is engaged, such as by being contacted with, or pressed upon, a surface. This second radio frequency might serve as a "touching" signal or a "pen-down" signal conveyed to digitizer 105. For instance, the "pen-down" signal might be substituted for the above-described "pen-up in-proximity" signal, or transmitted in addition thereto. Optionally, the "pen-down" signal might be transmitted through a dedicated line (not shown).

Moreover, the tip of stylus 152 has physical inking capabilities. For example, the "pen-down" signal might be activated by writing of text and/or marks upon markable surface 150, superimposed with respect to digitizer 105.

Furthermore, the "pen-up in-proximity" signal might be activated merely by hovering of the stylus with respect to recording unit 101, such as by hovering of the stylus over paper 150 placed atop the recording unit. Moreover, the "pen-down" and "pen-up in-proximity" signals might be sensed by the recording unit notwithstanding lack of direct physical touching, such as when user 154 maneuvers the stylus over and/or upon a sheet or layer of paper which is separated from working surface 103 by a number of other sheets or layers of paper and/or item(s).

Digitizer 105 generates a data stream (e.g., "stroke" data) representing the strokes of stylus 152, operated by user 154. The "stroke" data might comprise text and/or any number of marks, lines, and/or shapes written on, or in proximity to, working surface 103 of recording unit 101. For instance, digitizer 105 might generate the "stroke" data by monitoring and/or sampling the "pen-up in-proximity" signal and/or the "pen-down" signal across a receiver such as radio-sensitive grid 107. As described above, a physical inking capability of the tip of the stylus preferably further allows physical marking of, for example, paper 150 which is superimposed on the working surface.

Recording unit 101 thus serves to generate and record a data stream representing handwritten text. A user 154 might use the recording unit in conjunction with a number of sheets of paper 150 simply by placing and/or clipping the paper against working surface 103 of the recording unit. Strokes physically inked on the paper by stylus 152 can be electronically represented in a data stream generated by the recording unit. For example, the data stream might be recorded while any number of physical entry locations 200 (FIG. 4) receive handwritten strokes, thereby creating an electronic record of handwritten notes for correlation to their corresponding entry location(s), as discussed herein.

Data recordation is generally accomplished through detection of strokes and "events." For example, an event might be an occurrence which is assigned a predefined meaning. A variety of events might be defined in order to facilitate recording and/or processing of a data stream.

In particular, events might be categorized as automatically generated by recording unit 101 or as invoked by user 154, as discussed in the above-incorporated application Ser. No. 08/747,735. Namely, automatically generated events might occur and be detected and/or recorded without specific input from the user. When a predefined event (e.g., a pen-up in-proximity event) is detected, a unique data string identifying the event might be recorded. The recording unit 101 might then record a time and date stamp indicative of the time and date at which the event occurred. This recording of a time and date stamp in association with each event might facilitate later processing of stroke and event data.

Examples of user invocations of events include a "new page" event (e.g., used to identify the particular page of a writing medium upon which subsequent strokes will be made) and a "stroke characterization" event (e.g., used to indicate that certain strokes share a common characteristic, and/or used to label previously recorded data as being of a specific type). Further, the user might use soft button(s) 106, discussed above, and/or "bounding strokes" for invocation of events. That is, events, such as an invocation of switches or soft button(s) 106, might be defined to have certain meanings.

In one preferred embodiment, a pen-down event is defined which indicates that stylus 152 has been brought into contact with, for instance, markable surface 150. Also, there might be defined a pen-up event which indicates that the stylus has been lifted from, for example, the markable surface. Furthermore, recording unit 101 might provide additional information regarding a stylus which is not touching the markable surface, namely, whether the stylus is in proximity (a "pen-up in-proximity" event) or out of proximity (a "Pen-up out-of-proximity" event), as discussed herein.

FIGS. 5–6 represent examples of the logic used by recording unit 101 to accomplish scheduling. At STEP 400 of FIG. 5, initialization of system 100 occurs. Accordingly, a COUNTER in the logic design implementation is initialized to zero at STEP 400. The variable COUNTER is an integer which tracks how many consecutive pen-up in-proximity points are collected for a small region over digitizer 105, as detailed further below with respect to the logic branch to INQUIRY 460 from INQUIRY 406. Preferably, COUNTER is associated with a time interval.

STEP 400 might represent turning or switching on of recording unit 101. Furthermore, at STEP 400 (initialization of system 100) and until the logic proceeds past STEP 402, stylus 152 is pen-up out-of-proximity. That is, the stylus is beyond the radio frequency range of the recording unit. A loop starts at STEP 402. The loop serves to detect points representative of pen events. At STEP 402, the recording unit waits for the stylus to come within a predefined proximity of digitizer 105, with consequent progression to "getting a data point" at STEP 404.

At STEP 404, as soon as stylus 152 comes into proximity of recording unit 101, a data point representative of the location of the stylus is obtained by digitizer 105. In particular, in reaching STEP 404, the stylus is either pen-up in-proximity or else pen-down. By "getting the data point from the digitizer" (STEP 404) the recording unit determines an "xy" (e.g., a Cartesian coordinate system) value for the tip of the stylus with respect to the digitizer. The "xy" value is obtained so long as the stylus is in proximity to markable surface 150.

A "z" value might only factor into whether or not a point is obtained at all (e.g., whether the stylus is pen-up in-proximity or pen-up out-of-proximity). In other words, the "z" value might determine whether the logic has, in the first place, proceeded from STEP 402 to STEP 404.

After a data point has been obtained at STEP 404, INQUIRY 406 differentiates between a pen-down event and a pen-up in-proximity event. In one preferred embodiment, INQUIRY 406 distinguishes among these types of pen events for purposes of either displaying information or else scheduling appointments. As discussed further below, information corresponding to a selected time slot 200 might be displayed in response to a detection of suspension, hovering, or flotation of stylus 152 over the time slot.

At INQUIRY 406, a pen-up in-proximity event might indicate stylus 152 was lifted from markable surface 150, but remained within proximity of digitizer 105. Such an event can be detected and/or recorded automatically. Similarly, there might be defined a "pen-up out-of-proximity" event, which would indicate that the stylus was removed from the markable surface to a location relatively distant from the digitizer. Such events can be determined either from the sensed portion of the stylus or an input provided by a soft button.

A logical branch stemming from a negative response to INQUIRY 406 is now described, with an affirmative response to INQUIRY 406 described further below. Namely, at STEP 500A recording unit 101 has determined stylus 152 is actually touching (e.g., the tip is engaging or contacting)

markable surface 150. If the stylus were simply pen-up in-proximity, then, instead of STEP 500A, the logic would have proceeded from INQUIRY 406 to INQUIRY 460, as discussed further below. Accordingly, at STEP 500A the recording unit determines an "xy" value for the stylus.

Figure 4:
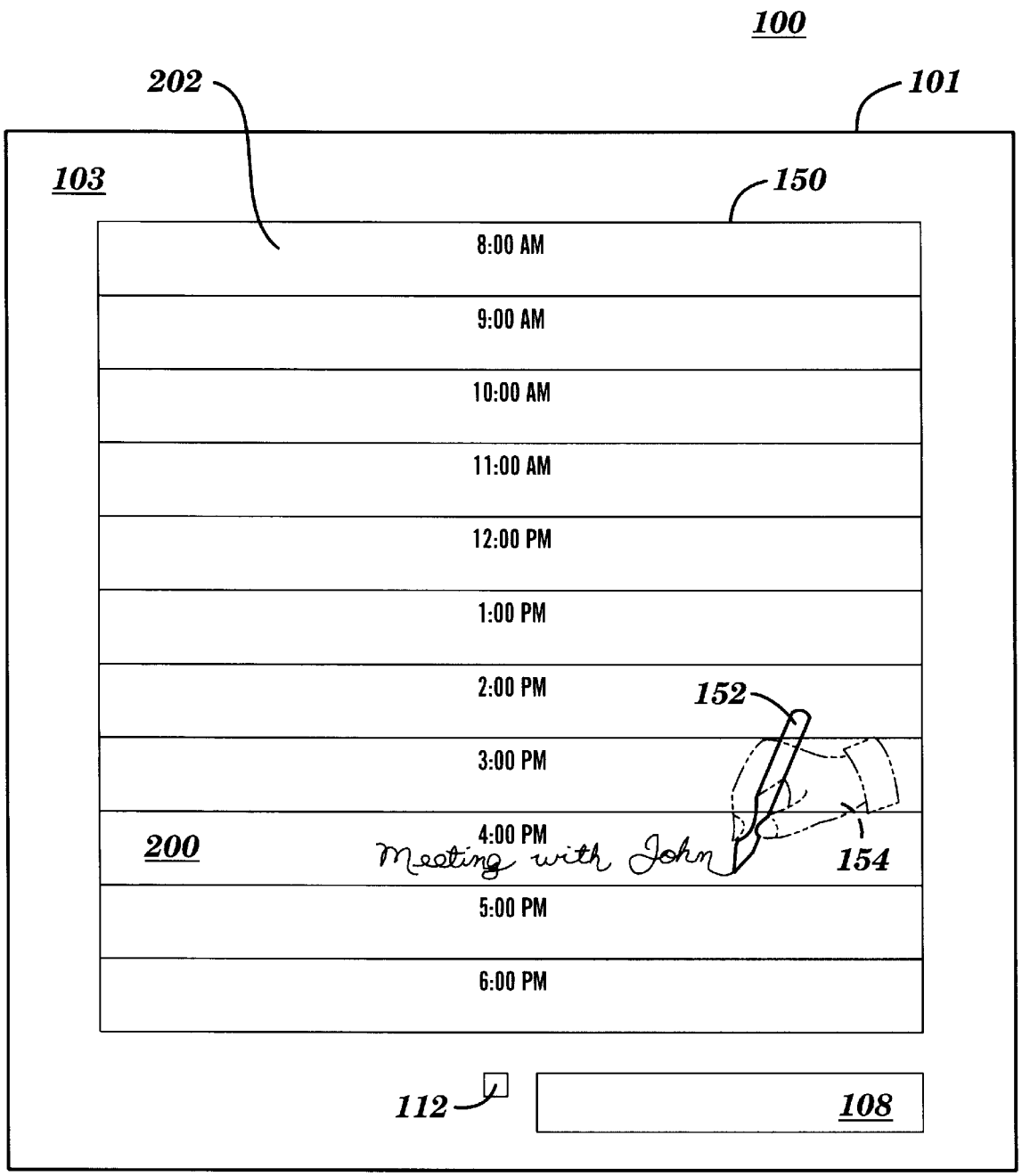
FIG. 4 is representation similar to FIG. 3 including a stylus, illustrating an appointment marking capability of the present invention.

FIG. 6 further illustrates STEP 500A (as well as STEP 500B, discussed below). In particular, FIG. 6 depicts an automatic detection of a time-slot event. When stroke data is detected as occurring within the predefined area of a given time slot 200, for example as shown in FIG. 4, a time-slot event is automatically generated by recording unit 101. More specifically, during monitoring of input at STEP 502, the recording unit might detect stroke data occurring within the designated area of the time slot, INQUIRY 504. In response thereto, a routine associated with an activation of the time slot is called, STEP 506.

Returning to FIG. 5 and proceeding from STEP 500A, INQUIRY 450 determines whether the present pen-down event is in the same time slot 200 at which the last pen-down event occurred. If the present time slot is different from the last pen-down time slot, then the present time slot is reserved, STEP 452.

Thus, a stroke might be defined as a series of stylus coordinates recorded between a pen-down event and a pen-up event. The (e.g., "xy") locations of pen-down strokes are determined for the purpose of reserving time slot(s) 200, STEP 452. For instance, STEP 452 might store data or set a flag in a memory location corresponding to a particular time slot (e.g., month/day/hour) 200 to be reserved. For example, this reserved status might be employed in the hovering logic (e.g., at STEP 480, discussed below) which instead proceeds through INQUIRY 460 from INQUIRY 406, in order to identify existing appointment(s).

STEP 452 from INQUIRY 450 simply allows recording unit 101 to keep track of which time slots 200 include appointments. In particular, user 154 might conduct multiple stroke events to mark a message in a certain time slot. Preferably, the user initially verifies whether that time slot previously contained an appointment. Namely, the user learns the status of a time slot by holding stylus 152 over that time slot without engaging the tip, as described below regarding logic procession through INQUIRY 460.

For whatever reason, should user 154 decide to begin marking a time slot 200, at STEP 500A (arrived at from INQUIRY 406) recording unit 101 will ascertain the time slot. At INQUIRY 450, the recording unit will determine whether or not the user had been marking with stylus 152 in this time slot just previously. If the user has begun marking in a different time slot 200, or is marking in a time slot for the first time since turning the recording unit on for the present session (STEP 400), then recording unit 101 takes care to record this time slot as reserved, STEP 452, as discussed above).

If INQUIRY 450 instead determines stylus 152 operated by user 154 had indeed been marking in the present time slot 200 just previously, then the marking simply proceeds (to STEP 470). For explanatory purposes, one might consider the exemplary marking illustrated in FIG. 4. When writing "Meeting with John," the INQUIRY 450 would evaluate whether the writing is in a new (e.g., previously unused) time slot 200. Assuming the four o'clock to five o'clock afternoon time slot had no preexisting appointments, then upon initial stroking of the "M" in "Meeting with John," STEP 452 would mark that time slot as reserved. As writing of that "M," as well as the remainder of the text, continued, the logic would loop between STEPS 402 and 490 while passing through STEP 500A, INQUIRY 450, and STEP 470. So long as the writing remained within the same four o'clock to five o'clock afternoon time slot, that time slot would be marked reserved just once. In other words, STEP 452 would be traversed only at the initial stroking for the "M," in this example.

As will be appreciated by those skilled in the art, design choices might allow numerous variations, settable by user 154 and/or a manufacturer, retailer, and/or servicing entity. Consider a case where a selected time slot 200 contains preexisting text (e.g., as depicted in FIG. 4, discussed below). A predefined stroke pattern and/or soft button event might determine how that preexisting text is to be treated. For instance, text which is written presently might be appended to the preexisting text. Optionally, the time slot might be treated as a fixed field, where later written text at the same "xy" coordinate(s) replaces earlier written text. Further, system 100 might be configured to require any preexisting text be dealt with explicitly (e.g., an earlier-scheduled appointment must be canceled) before other text may be entered at the same time slot. For example, a preselected time interval might be used to distinguish between present and preexisting scheduling entries.

After entering text and/or carrying out any operation(s) with respect to recording unit 101 as a portable system 100, user 154 preferably (at a convenient time) connects the recording unit to a PC and/or server(s) or network(s) for uploading of any new, modified, and/or changed (e.g., scheduling) information to a database. The server or network might be accessible by other users, for example, peers, customers, overseers, and/or administrative assistants. Furthermore, the other user(s) may have differing level(s) of access. For instance, some other user(s) might have permission, clearance, or rights to (e.g., tentatively) schedule appointments for user 154, who might be temporarily operating with a particular recording unit 101 unconnected with the network. At uploading, external scheduling requests might be synchronized, rectified, and downloaded to the recording unit for assembly of a unified schedule for the user. Additionally, any of a variety of priority, updating, verification, and/or conflict resolution schemes might be employed in such a network.

For example, an individual required to arrange a meeting might access scheduling information for a plurality of users 154 operating with respective recording units 101. The users 154 preferably would have recently linked to the network so their scheduling information therein would be relatively current. Advantageously, the individual required to arrange the meeting might locate any number of compatible time slots 200 for the users 154 to meet (e.g., in person, by phone, and/or through video-conferencing). Furthermore, that individual might schedule the meeting for the users 154, who might then have that meeting added to their respective schedules immediately on the network, and soon to their recording units (at their next connection to the network).

Returning to FIG. 5, COUNTER is reset to zero at STEP 470, since a hovering (conflict check) event is not underway. Namely, COUNTER is zeroed because the portion of the logic associated with INQUIRY 450 and/or STEP 452 is dealing with pen-down events. The loop ends at STEP 490, with the possibility of continued looping through STEPS 402 and 404, and to INQUIRY 406.

Now, a logical branch stemming from an affirmative response to INQUIRY 406 is described. In reaching INQUIRY 460 therefrom, activity of stylus 152 (FIG. 4) has been detected (STEP 404) and the stylus has been determined to be in proximity, but not touching. That is, a pen-up in-proximity event has occurred.

Pen-up in-proximity might reflect "hovering" of stylus 152 within some distance of digitizer. 105 In particular, a location of the stylus might be detected and determined by emission and/or receipt of a radio frequency. As appropriate, repeated loops through INQUIRY 460 might advantageously allow a check for (e.g., scheduling) conflicts with respect to a selected time slot 200.

In one example, pen-up in-proximity events might traverse or run across a plurality of entry locations 200, not staying within a "delta" (described below) of any immediately preceding point. In such a case, recording unit 101 might consider the activity "meandering." Here, a "hovering" condition does not exist, and COUNTER is reset to zero at STEP 470. Looping might then continue through STEP 490.

In another example, STEP 462 and INQUIRY 464 might recognize "hovering" of stylus 152 over the selected time slot 200. In the example depicted in FIG. 5, INQUIRY 460 "looks at" a small region of digitizer 105. The region is small because user 154 typically cannot hold stylus 152 completely motionless. Namely, a hand is going to move at least slightly. As represented in FIG. 3, the user might bring and hold a stylus 152 above the one o'clock to two o'clock afternoon time slot 200 for some period or length of time, in order to check to see whether that time slot is (e.g., partially or totally) open (available).

The "small" region is designated by a "delta" in INQUIRY 460. So, with pen-up in-proximity, INQUIRY 460 asks whether the "xy" point is different from the last "xy" point by less than a delta. That is, INQUIRY 460 determines whether the present location of stylus 152 is within some delta of the previous location of the stylus. In particular, INQUIRY 460 is a distance inquiry. INQUIRY 460 asks whether the position of the stylus is within some preselected distance of the immediately preceding position of the stylus.

If an affirmative determination is made at INQUIRY 460, then COUNTER is incremented (STEP 462) in order to proceed toward representing a basically stationary or non-moving condition of stylus 152. If this condition persists for longer than a preselected THRESHOLD (INQUIRY 464), then a hovering condition exists.

In an alternative embodiment, a soft button event, rather than a pen-up in-proximity event, might serve to request a conflict check.

As mentioned above, COUNTER might be an integer which tracks how many consecutive pen-up in-proximity points are collected for a small region over digitizer 105. COUNTER might be associated with an interval (THRESHOLD) such as one-half second or one to five seconds. Preferably, user 154 can set or determine a time interval (THRESHOLD) to be associated with COUNTER.

In proceeding through STEP 462 to INQUIRY 464, if COUNTER exceeds THRESHOLD, then user 154 is considered to be holding stylus 152 basically steady over some time slot 200. Then, the selected time slot 200 is identified at STEP 500B. Similarly to STEP 500A described above, STEP 500B might access the logic of FIG. 6.

User 154 has selected a time slot 200 (STEP 500B), so STEP 480 retrieves available scheduling information for that time slot. For instance, STEP 480 might retrieve data from a memory location corresponding to the particular time slot (e.g., month/day/hour) about which information is sought. Desirably, the scheduling information for the time slot corresponding to the most recent pen-up in-proximity point is displayed (STEPS 480 and 482).

As mentioned above, a reservation possibly set in STEP 452 can be used at STEP 480. For instance, STEP 480 might utilize the reservation status in multi-level or mapped buffers, tables, or caches to increase memory access speed, as will be understood by those skilled in the art. STEP 482 displays the existing scheduling information for the selected time slot.

For example, STEP 482 might employ display 108 (FIG. 3) to display preexisting scheduling information, such as "Lunch with Bob E." With regard to use of display 108, an image of the original handwritten text might be displayed. Optionally, character recognition might be employed, so standardized (e.g., ASCII) characters are displayed. Further, unrecognized characters might be displayed as handwritten, or omitted during a conflict check. Alternatively, multiple levels of user information access might be employed. For instance, a user 154 with whom a particular scheduled event is associated might restrict access by a different user, or even by that user himself in certain fashions (such as for security purposes). In any event, indicator 112 (FIG. 3) might be employed to signal a conflicting appointment. The indicator might be employed in addition to, or instead of, information on display 108. For example, the indicator 112 might emit an audible "beep" and/or a visual LED "flash." Further, multiple tones, frequencies, intensities, and/or pulsations and the like might be employed to vary indicator 112, such as for association or identification with special time slot(s) 200, user(s) 154, and/or subject matter entailed in scheduling information.

Next, the loop ends at STEP 490, with the possibility of continued looping through STEPS 402 and 404, and to INQUIRY 406.

Numerous alternative embodiments of the present invention exist. Entry location 200 might have any form and/or represent any data. COUNTER might have any value and be associated with any variable and/or any time interval. Markable surface 150 might have any form and/or include any constituent material(s). Template 202 of markable surface 150 might have any configuration and/or include any designation(s), with recording unit 101 optionally correlating thereto any field(s) as entry location(s) 200. For instance, template 202 might designate fields 200, such as for a negotiable instrument (e.g., a check). Further, fields 200 might be processed by recording unit 101, and/or a linked network, for generation of, for example, expense account statement(s). Additionally, stylus 152 might operate with any number of signals, which recording unit 101 might interpret in any number of ways.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

It will be apparent that the invention will be applicable to scheduling tasks such as resource allocation, as well as personal appointment management (calendaring) and the like.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A scheduling facilitation method, comprising:
   storing an electronic representation of a schedule in a recording unit, said schedule including a number of entry locations, said recording unit including a working surface thereon, said working surface superimposed with a markable surface having thereon a physical representation of said entry locations, said physical representation including therein one or more designations allowing user identification of a selected entry location of said entry locations;

correlating a part of said working surface to said entry locations;

selecting said selected entry location on said markable surface with a stylus;

providing a stroke signal and a stroke mark with said stylus, said stroke signal conveying to said recording unit a section of scheduling information for said selected entry location, said stroke mark conveying to said markable surface said section of scheduling information;

storing an indication of said section of scheduling information in a portion of said electronic representation of said schedule associated with said selected entry location; and reserving said selected entry location in said electronic representation of said schedule to track that scheduling information is already associated with said selected entry location.

2. The method of claim 1, further comprising providing a scheduling conflict check signal for said recording unit upon user selection of said selected entry location, said recording unit associating said scheduling conflict check signal with said selected entry location; and responsive to said scheduling conflict check signal, said recording unit checking whether said selected entry location is reserved.

3. A scheduling facilitation method, comprising:

storing an electronic representation of a schedule in a recording unit, said schedule including a number of entry locations, said recording unit including a working surface thereon, said working surface superimposed with a markable surface having thereon a physical representation of said entry locations, said physical representation including therein one or more designations allowing user identification of a selected entry location of said entry locations;

correlating a part of said working surface to said entry locations;

providing a scheduling conflict check signal for said recording unit upon user selection of said selected entry location, said recording unit associating said scheduling conflict check signal with said selected entry location; and responsive to said scheduling conflict check signal, said recording unit checking said electronic representation of said schedule to determine whether scheduling information is already associated with said selected entry location.

4. The method of claim 3, further comprising indicating whether said scheduling information exists in said electronic representation of said schedule, responsive to said scheduling conflict check signal.

5. The method of claim 4, wherein said indicating comprises emitting one or more of an audio signal and a visual signal, when said scheduling information exists.

6. The method of claim 3, further comprising indicating to a user a portion of said scheduling information when said scheduling information exists, responsive to said scheduling conflict check signal.

7. The method of claim 6, wherein said indicating comprises displaying said portion of said scheduling information, when said scheduling information exists.

8. The method of claim 3, further comprising allowing user deletion of a portion of said scheduling information, when said scheduling information exists in said electronic representation of said schedule.

9. The method of claim 8, wherein said allowing comprises enabling one or more of user operation of a soft button and user conducting of a special stroke with said stylus.

10. The method of claims 3, further comprising linking said recording unit to a network for synchronization of said schedule.

11. The method of claim 10, wherein said synchronization includes one or more of uploading information from said recording unit to said network and downloading information from said network to said recording unit.

12. The method of claim 10, wherein said network provides a number of levels of authorization for controlling user access to said schedule.

13. The method of claim 3, wherein said scheduling conflict check signal providing comprises one or more of user selection of a soft button and user holding of said stylus proximate to said working surface.

14. The method of claim 3, further comprising the steps of:

selecting said selected entry location on said markable surface with said stylus;

providing a stroke signal and a stroke mark with said stylus, said stroke signal conveying to said recording unit a section of scheduling information for said selected entry location, said stroke mark conveying to said markable surface said section of scheduling information; and storing an indication of said section of scheduling information in a portion of said electronic representation of said schedule associated with said selected entry location.

15. A scheduling facilitation system, comprising:

a recording unit including a memory, a logic design implementation, and a working surface, said memory storing an electronic representation of a schedule including a number of entry locations therein, said logic design implementation serving to correlate a part of said working surface to said entry locations;

said working surface superimposed with a markable surface having thereon a physical representation of said entry locations, said physical representation including therein one or more designations allowing user identification of a selected entry location of said entry locations;

a stylus allowing user selection of said selected entry location on said markable surface, said stylus providing a stroke signal and a stroke mark, said stroke signal conveying to said recording unit a section of scheduling information for said selected entry location, said stroke mark conveying to said markable surface said section of scheduling information;

said memory storing an indication of said section of scheduling information in a portion of said electronic representation of said schedule associated with said selected entry location;

said stylus providing a scheduling conflict check signal for said recording unit upon user selection of said selected entry location, said recording unit associating said scheduling conflict check signal with said selected entry location; and responsive to said scheduling conflict check signal, said recording unit checking said electronic representation of said schedule to determine whether scheduling information is already associated with said selected entry location.

16. The system of claim 15, wherein said markable surface comprises a layer of paper and said stroke mark comprises one or more of ink and graphite.

17. The system of claim 15, wherein a number of layers are disposed between said markable surface and said working surface.

18. The system of claim 15, wherein said stroke signal comprises a radio frequency.

19. The system of claim 15, wherein said recording unit includes a digitizer.

20. The system of claim 19, wherein said digitizer has a character recognition capability.

21. The system of claim 15, wherein said logic design implementation includes one or more of software and hardware.

22. The system of claim 21, wherein said recording unit is selectively linkable to a network for synchronization of said schedule.

23. The system of claim 22, wherein said synchronization includes one or more of uploading information from said recording unit to said network and downloading information from said network to said recording unit.

24. The system of claim 22, wherein said network provides a number of levels of authorization for controlling user access to said schedule.

25. The system of claim 15, wherein said recording unit indicates said selected entry location is reserved in said electronic representation of said schedule.

26. The system of claim 15 wherein said number of entry locations comprise time slots of an electronic representation of a schedule and said selected entry location comprises a selected time slot.

27. A scheduling facilitation system, comprising:
a recording unit including a memory, a logic design implementation, and a working surface, said memory storing an electronic representation of a schedule including a number of entry locations therein, said logic design implementation serving to correlate a part of said working surface to said entry locations;
said working surface superimposed with a markable surface having thereon a physical representation of said entry locations, said physical representation including therein one or more designations allowing user identification of a selected entry location of said entry locations;
means for providing a scheduling conflict check signal for said recording unit upon user selection of said selected entry location, said recording unit associating said scheduling conflict check signal with said selected entry location; and
responsive to said scheduling conflict check signal, said recording unit checking said electronic representation of said schedule to determine whether scheduling information is already associated with said selected entry location.

28. The system of claim 27, wherein said logic design implementation serves to associate said scheduling conflict check signal with said selected entry location.

29. The system of claim 28, further comprising an indicator serving to indicate whether said scheduling information exists in said electronic representation of said schedule, responsive to said scheduling conflict check signal.

30. The system of claim 29, wherein said indicator provides one or more of an audio signal and a visual signal, when said scheduling information exists.

31. The system of claim 29, wherein said indicator serves to indicate to a user a portion of said scheduling information when said scheduling information exists, responsive to said scheduling conflict check signal.

32. The system of claim 31, wherein said indicator serves to display said portion of said scheduling information, when said scheduling information exists.

33. The system of claim 27, wherein said recording unit allows user deletion of a portion of said scheduling information, when said scheduling information exists in said electronic representation of said schedule.

34. The system of claim 33, wherein said deletion occurs upon one or more of user operation of a soft button and user conducting of a special stroke with said stylus.

35. The system of claim 27, wherein said scheduling conflict check signal is provided through one or more of user selection of a soft button and user holding of a stylus proximate to said working surface.

36. The system of claim 21, wherein said logic design implementation includes one or more of software and hardware.

37. The system of claim 27, further comprising a stylus that allows user selection of said selected entry location on said markable surface, said stylus providing a stroke signal and a stroke mark, said stroke signal conveying to said recording unit a section of scheduling information for said selected entry location, said stroke mark conveying to said markable surface said section of scheduling information; and
said memory storing an indication of said section of scheduling information in a portion of said electronic representation of said schedule associated with said selected entry location.

38. A paper-based correlation system, comprising:
a recording unit including a memory, a logic design implementation, and a working surface, said memory storing an electronic representation of a template including a number of entry locations therein, said logic design implementation serving to correlate a part of said working surface to said entry locations;
said working surface superimposed with a markable surface having thereon a physical representation of said entry locations, said physical representation including therein one or more designations allowing user identification of a selected entry location of said entry locations;
a stylus allowing user selection of said selected entry location on said markable surface, said stylus providing a stroke signal and a stroke mark, said stroke signal conveying to said recording unit a section of field information for said selected entry location, said stroke mark conveying to said markable surface said section of field information;
said memory storing an indication of said section of field information in a portion of said electronic representation of said template associated with said selected entry location;
said stylus providing an information conflict check signal for said recording unit upon user selection of said selected entry location, said recording unit associating said information conflict check signal with said selected entry location; and responsive to said information conflict check signal, said recording unit checking said electronic representation of said template to determine whether information is already associated with said selected entry location.

39. The system of claim 38, wherein said template resembles a negotiable instrument.

40. The system of claim 38, wherein said logic design implementation includes one or more of software and hardware.

* * * * *

UNITED STATES PATENT AND TRADEMARK OFFICE
CERTIFICATE OF CORRECTION

PATENT NO. : 6,144,371
DATED : November 7, 2000
INVENTOR(S) : Clary et al.

It is certified that error appears in the above-identified patent and that said Letters Patent is hereby corrected as shown below:

Column 2,
Line 21, delete "helec-" and replace with -- elec- --.

Claims,
Column 15, claim 29,
Line 1, delete "28" and replace with -- 27 --.

Column 16, claim 36,
Line 1, delete "21" and replace with -- 27 --.

Signed and Sealed this

Twenty-third Day of October, 2001

Attest:

*Nicholas P. Godici*

NICHOLAS P. GODICI
*Attesting Officer*  *Acting Director of the United States Patent and Trademark Office*